Dec. 30, 1958     T. I. DUFFY     2,866,358
PEDAL FOR FOOT PROPELLED VEHICLES
Filed Jan. 14, 1957
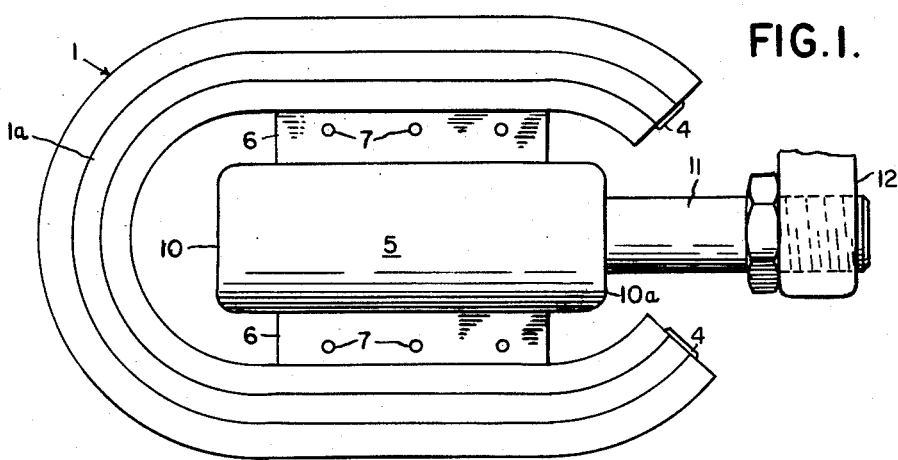
FIG. 1.
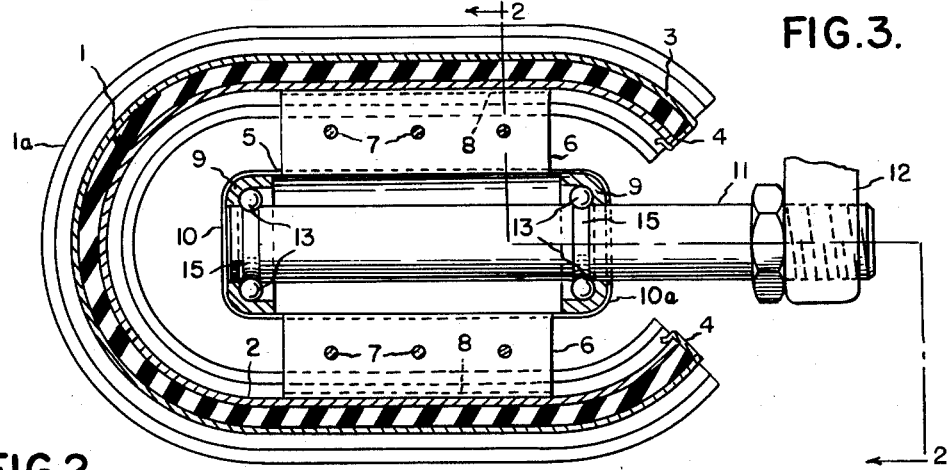
FIG. 3.
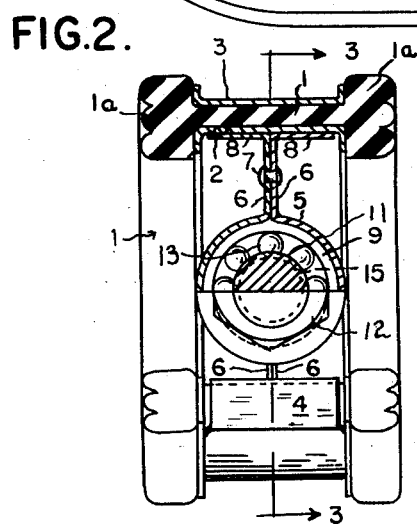
FIG. 2.
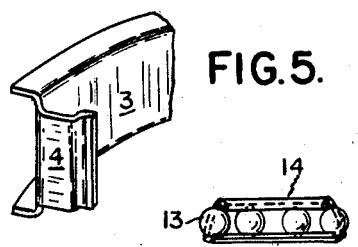
FIG. 5.
FIG. 4.
INVENTOR.
THOMAS I DUFFY
BY
J. S. Murray
ATTORNEY United States Patent Office 2,866,358
Patented Dec. 30, 1958

2,866,358

PEDAL FOR FOOT PROPELLED VEHICLES

Thomas I. Duffy, Spring Lake, Mich., assignor to Ethel M. Benedict, Detroit, Mich.

Application January 14, 1957, Serial No. 633,981

4 Claims. (Cl. 74—594.4)

This invention relates to pedals for bicycles and the like and relates particularly to an improvement on the construction disclosed by my Patent 2,298,283, issued October 13, 1942.

An object of the invention is to materially simplify the patented construction and reduce its manufacturing cost. Another object is to revolubly mount a pedal upon its journal pin solely by means of antifriction elements.

Another object is to minimize any access of dust, dirt or moisture to said elements.

Another object is to adapt an elongated strip of rubber or the like having an approximate U shape, to form opposed tread faces of the pedal, and to utilize the resiliency of such strip to maintain its engagement with the pedal, eliminating certain fastenings required by the patented construction.

Another object is to employ a pair of rigidly interconnected stampings to jointly form the hub of a pedal and a web projecting oppositely from the hub in a diametrical relation to the latter and a pair of seating members oppositely spaced by the web from the hub to mount a resilient tread member of an approximate U shape, and to retain the tread member on its seat by two elongated sheet metal bands, respectively engaging the inner and outer faces of the tread member, the inner band being carried by said web and the outer band being terminally secured to the inner band.

These and various other objects are attained by the construction hereinafter described and illustrated in the accompanying drawing, wherein:

Fig. 1 is an elevational view of the improved pedal operatively mounted on a crank pin.

Fig. 2 is a cross sectional view of the same, taken on the line 2—2 of Fig. 3.

Fig. 3 is an axial sectional view of the pedal and pin taken on the line 3—3 of Fig. 2.

Fig. 4 is an enlarged diametrical sectional view of an ordinary type of retainer for a set of antifriction balls.

Fig. 5 is a fragmentary perspective view of an end portion of one of said bands showing particularly a latch tongue formed on such portion.

In these views, the reference character 1 designates an elongated strip of rubber or like flexible and resilient material formed preferably by extrusion and bent to an approximate U shape. As best appears in Fig. 2, such strip is substantially I-shaped in cross section, thus having two relatively thick spaced elongated beads 1a conforming to the U shape of the strip and providing alternatively used tread faces at opposite sides of the pedal. Between the beads 1a, the strip 1 has its inner and outer faces grooved from end to end thereof to snugly receive inner and outer elongated sheet metal bands 2 and 3 of a U shape conforming to the rubber strip. The outer band has tongues 4 projecting from its ends and bent toward each other across the ends of the rubber strip and hooked to lap end portions of the inner band. To so interengage the two bands, heavy pressures may be applied to their semicircular portions, thus compressing the rubber between such portions and sufficiently shifting the bands along their U axis to allow the tongues 4 to take effect. Upon relieving the described compression, the bands will return to their intended illustrated relation (Fig. 3), thus snapping the hooked tongues 4 into place. The rubber strip will be maintained under compression, particularly in the yoke portion of such strip, to induce a considerable tension in the band 3 and thus firmly maintain the effective positions of said tongues.

Centrally disposed within the opening formed by the described parts and at the longitudinal axis of the pedal is a hollow cylindrical hub 5 formed by complementary semicylindrical mid-portions of two duplicate sheet metal stampings having contiguous plane portions 6 extending oppositely and radially from the hub. The portions 6 of the stampings are rigidly interconnected as by rivets 7. Adjoining the inner band 2, the portions 6 of the two stampings are oppositely marginally bent as at 8 to lap such band and are welded or otherwise rigidly attached to the latter. The extent of the portions 6 and their bent margins is preferably somewhat less, lengthwise of the pedal, than the length of the hub 5. Thus it is evident that the web formed by the portions 6, with its bent outer margins and with the band 2 form a means for mounting the strip 1 on the hub.

Press-fitted in the ends of the hub is a pair of cups 9 which conform to and seat against end portions 10 and 10a of the hub. The end portion 10 confronts the semicircular closed end of the pedal and completely closes the corresponding end of the hub against access of dust, dirt or moisture. The end portion 10a is centrally apertured to accommodate the crank pin 11, and has the minimum clearance from the pin requisite for pedal rotation. Said pin extends through and beyond the open end of the pedal and is terminally connected to a crank arm 12, as by screwing the pin into such arm.

Each of the cups 9 receives a set of revoluble antifriction balls 13, and within each cup, the pin 11 is formed with a shallow annular groove 15 serving as an inner raceway for the balls. The cups 9 retain the two sets of balls in the grooves 15, said cups forming outer raceways. Being thus retained in the grooves, the two sets of balls resist any sliding of the pedal along the pin from the intended operative position of the pedal.

It will be noted in Fig. 3 that the end portions of the rubber tread member of the described pedal and the metal bands reinforcing such member are curved inward toward each other in projecting beyond the plane portions 6 of the stampings which mount said tread member on the hub. This tends to strengthen said end portions, while increasing the area of the tread faces and renders superfluous any interconnection between said end portions.

By eliminating fastenings extending through the rubber strip for clamping the bands 2 and 3 to such strip, there is effected a desirable saving both in material and labor. Interengaging the two bands at their free ends by the tongues 4, and utilizing resiliency of the rubber to maintain such interengagement considerably simplifies and expedites assembly.

A further material saving of material and labor results from properly positioning the pedal on its pin by setting the balls 13 into grooves 15 predeterminedly located in the crank pin.

It will be evident that the described hub, having one end fully closed and its other end afforded a minimum clearance from the crank pin, will effectively resist access of dust, dirt or moisture to the antifriction bearings.

In the described construction, use of the duplicate stampings each comprising a hub portion 5, a web portion 6, and seats 8 for the reinforced tread strip, derives an important advantage believed original with this application. It has been the practice heretofore to retain a pedal on its crank pin by providing on such pin abutments between which the pedal, or a part thereof, has been held in place, and one such abutment has generally been a nut threaded on the free end of the pin.

The pedal, as now improved, cannot be slipped lengthwise on the pin as in prior practice due to the end walls 10 and 10a of the hub. Assembly is effected by first sliding the inner cup 9 to the inner end portion of the pin; then sliding the two sets of balls 13 to register them with the grooves 15, then sliding the cups 9 to their illustrated relation to the ball sets; then disposing the duplicate stampings in their illustrated relation to the pin and cups; and finally rigidly interconnecting the stampings. Such retainers as exemplified at 14 in Fig. 4, permit the balls of each set to be handled as a unit in effecting the described assembly. Such a retainer affords such slight radial play of the balls as is entailed by their disposal in the shallow grooves 15.

What I claim is:

1. In a foot propelled vehicle pedal of the type employing an elongated resiliently flexible strip bent to an approximate U shape and having opposed tread faces conforming to said shape of the strip, an elongated metal band conforming to and set into the exterior face of said strip, a hollow hub disposed within and substantially coaxially with said strip, and means rigidly carried by and oppositely projecting from the hub and set into the interior face of said strip to mount the strip on the hub, the combination with said band and mounting means, of a pair of tongues respectively projecting from the respective ends of the band and bent toward each other to attach said ends to the mounting means, the strip being compressively stressed to apply a tensional stress to the band for maintaining interengagement of said tongues and mounting means.

2. A foot propelled vehicle pedal as set forth in claim 1, said mounting means including a second band conforming to and set into the interior face of the strip, and said tongues attaching the ends of the first mentioned band to the ends of the second band.

3. In a foot propelled vehicle pedal as set forth in claim 1, a crank pin inserted in said hub and formed interiorly of the hub with spaced annular grooves, a set of antifriction elements revolubly set into each of said grooves, and a pair of cups apertured to accommodate said pin and set into the ends of the hub and forming outer race members for the antifriction elements and retaining such elements in the grooves, the hub having inturned end portions engaging said cups.

4. In a foot propelled vehicle pedal of the type employing an elongated resiliently flexible strip bent to an approximate U shape and having opposed tread faces conforming to said shape of the strip, an elongated metal band conforming to and set into the exterior face of said strip, a hollow hub disposed within and substantially coaxially with said strip, and means rigidly carried by and oppositely projecting from the hub and set into the interior face of said strip to mount the strip on the hub, the combination with said pedal, of a journal pin inserted in said hub and formed interiorly of the hub with spaced annular grooves, a set of antifriction elements revolubly set into each of said grooves, and a pair of cups set into the ends of the hub and forming outer race members for the antifriction elements and retaining such elements in the grooves, the hub having a fully closed end adjoining a free end of said pin and the other hub end being partially closed but having an opening adequate to accommodate the journal pin, said hub ends retaining said cups in their use position.

References Cited in the file of this patent

UNITED STATES PATENTS

| 563,959 | Grothe | July 14, 1896 |
| 582,292 | Kirshaw | May 11, 1897 |
| 601,607 | Bickel | Mar. 29, 1898 |
| 1,490,085 | Batcheller | Apr. 15, 1924 |
| 1,978,494 | Junkers | Oct. 30, 1934 |
| 2,298,283 | Duffy | Oct. 13, 1942 |

FOREIGN PATENTS

| 733,332 | Germany | Mar. 24, 1943 |
| 863,012 | Germany | Jan. 15, 1953 |
| 678,745 | Great Britain | Sept. 10, 1952 |